US012737403B2

(12) United States Patent
Liu

(10) Patent No.: US 12,737,403 B2
(45) Date of Patent: Sep. 15, 2026

(54) LARGE LANGUAGE MODEL RANKING GENERATION AND REPORTING SYSTEM

(71) Applicant: Jim Liu, Las Vegas, NV (US)

(72) Inventor: Jim Liu, Las Vegas, NV (US)

( * ) Notice: Subject to any disclaimer, the term of this patent is extended or adjusted under 35 U.S.C. 154(b) by 0 days.

(21) Appl. No.: 18/922,789

(22) Filed: Oct. 22, 2024

(65) Prior Publication Data

US 2026/0111470 A1 Apr. 23, 2026

(51) Int. Cl.
*G06F 16/334* (2025.01)
*G06F 40/205* (2020.01)

(52) U.S. Cl.
CPC ........ *G06F 16/3346* (2019.01); *G06F 40/205* (2020.01)

(58) Field of Classification Search
CPC .................................................. G06F 16/3346
USPC ......................................................... 707/748
See application file for complete search history.

(56) References Cited

U.S. PATENT DOCUMENTS

2020/0311790 A1* 10/2020 Keren ................ G06Q 20/4016
2024/0378395 A1* 11/2024 Sommers ................ H04L 41/08
2025/0348665 A1* 11/2025 Song ........................ G06F 40/20
2025/0348764 A1* 11/2025 Lemmer ................ G06N 20/00

OTHER PUBLICATIONS

Lu, Zhan-Qian John. "Estimating Instrument Performance: with Confidence Intervals and Confidence Bounds." NIST Technical Note 2119. Oct. 6, 2024. https://nvlpubs.nist.gov/nistpubs/TechnicalNotes/NIST.TN.2119.pdf (Year: 2024).*

Wang et al. "Self-Consistency Improves Chain of Thought Reasoning in Language Models." Mar. 7, 2023. https://arxiv.org/pdf/2203.11171 (Year: 2023).*

* cited by examiner

*Primary Examiner* — Kimberly L Wilson
(74) *Attorney, Agent, or Firm* — Rosenberg, Klein & Lee

(57) ABSTRACT

A large language model (LLM) ranking generation and reporting system includes a processing module that is electrically connected to a user interface module, a communications module, and a memory module. When the processing module receives an input signal through the user interface module, the processing module executes the following steps: based on the input signal, prompting an LLM on an LLM server about an internet entity for n times through the communications module, correspondingly receiving n batches of answers from the LLM, and logging each of the batches of answers in the memory module; wherein the answers include a first entity; calculating an appearance frequency of the first entity as a number of batches containing the first entity divided by n, and calculating a confidence score for the first entity; displaying the first entity along with its appearance frequency and its confidence score through the user interface module.

25 Claims, 8 Drawing Sheets

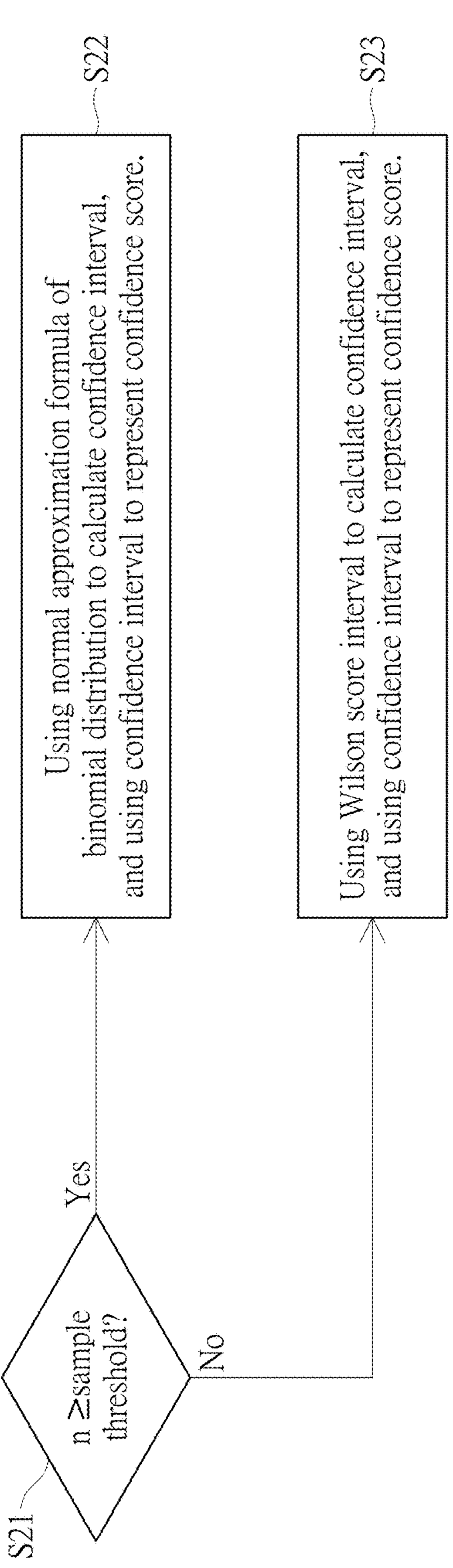
S21
n ≥sample threshold?
Yes
No
S22
Using normal approximation formula of binomial distribution to calculate confidence interval, and using confidence interval to represent confidence score.
S23
Using Wilson score interval to calculate confidence interval, and using confidence interval to represent confidence score.
FIG. 3

20

201

202

CHATGPT RANKINGS SETUP

Keywords (10 Max)

Website (Select One)

Select project

Language

US English

Location

Sample Size

6× MGPT Sampling

AI Engine

GPT-4o

Run Rankings

Clear All

CHATGPT RANKINGS REPORTS

| Keywords | Website | Language | Location | Date | |
|---|---|---|---|---|---|
| seo competitive analysis | ahrefs.com | US English | | 2024-09-05 06:19:34 | Ready |
| checking backlinks, backlink checker...... | ahrefs.com | US English | | 2024-09-05 06:13:07 | Ready |

View All

FIG. 7

LARGE LANGUAGE MODEL RANKING GENERATION AND REPORTING SYSTEM

BACKGROUND OF THE INVENTION

1. Field of the Invention

The present invention relates to a ranking generation and reporting system for an internet entity, more particularly a large language model ranking generation and reporting system for analyzing and obtaining a rank of the internet entity.

2. Description of the Related Art

A generative artificial intelligence chatbot like ChatGPT is based on a large language model (LLM) to answer queries. More particularly, an LLM such as ChatGPT-4 (GPT-4) uses a large artificial neural network (ANN) to generate an answer for a query, with the answer being the most probable sought-after answer for the query in a closed pool system that is the LLM.

However, GPT-4 is known to introduce noise in its probabilistic answer in order to introduce variation into its generated answer. Furthermore, a degree of noise being introduced corresponds to the degree of variation allowed in the answer generated by the GPT-4. The degree of noise may be understood as a temperature being introduced to the closed pool system that is the LLM, with the higher the temperature being introduced, the higher degree of variation is the answer being generated from the LLM.

As opposed to explicitly calculate statistical probabilities, GPT-4 covertly sought the most probable probabilistic answer with unknown amount of temperature in its pooling process, and presents the answer authoritatively to a user. For the user, this covert calculation process creates an underlining uncertainty to the answer generated by the GPT-4, thus making the answer generated by the GPT-4 less definitive. For example, when being asked about an internet entity from the user, such as when being asked about a popularity or a rank about a website or a meme, GPT-4 does not disclose quantitatively how much confidence the generated answer has during the pooling process from the closed pool system. As a result, the user is left without a metric or a number to gauge the confidence of the generated answer, i.e. without a way to quantitatively interpret how much noise or variation the generated answer is pooled from the LLM.

SUMMARY OF THE INVENTION

The present invention provides a large language model (LLM) ranking generation and reporting system. The LLM ranking generation and reporting system of the present invention comprises:

- a user interface module;
- a communications module, connected to an internet, and configured to communicate with an LLM server through the internet;
- a memory module, storing a number n, wherein n is a positive integer greater than one; and
- a processing module, electrically connected to the user interface module, the communications module, and the memory module;

wherein the processing module comprises an LLM processing unit and a math unit; when the processing module receives an input signal through the user interface module, the processing module executes the following steps:

- based on the input signal, prompting an LLM on the LLM server about an internet entity for n times through the communications module, correspondingly receiving n batches of a plurality of answers from the LLM, and logging each of the batches of the answers as samples in the memory module; wherein the LLM processing unit accesses the LLM through the communications module to request for the answers from the LLM; wherein the answers comprise a first entity;
- calculating an appearance frequency of the first entity as a number of batches containing the first entity divided by n by the math unit, and calculating a confidence score for the first entity;
- displaying the first entity along with the appearance frequency of the first entity and the confidence score for the first entity through the user interface module.

The present invention prompts the LLM n times for gathering multiple samples of response, then by analyzing the samples of response to determine the appearance frequency and the confidence score of the responses, the present invention is able to quantitatively inform a user about the certainties (or uncertainties) of having an answer with the first entity. In the words, the present invention is able to quantify the confidence of an answer as the confidence score by multi-sampling the LLM's responses and analyzing the samples of the responses, thus providing the user additional insights for the internet entity. A current LLM, such as GPT-4, without the integration of LLM ranking generation and reporting system of the present invention, lacks a smart feature to conduct such a multiple-prompts-sampling operation about the internet entity for the benefit of gaining confidence-related insight about the internet entity. The LLM ranking generation and reporting system of the present invention provides a novel and smart integration of the currently existing LLM for providing unprecedented insights for the internet entity.

BRIEF DESCRIPTION OF THE DRAWINGS

FIG. 3 is another flow chart of steps executed by the processing module of the LLM ranking generation and reporting system of the present invention.

FIG. 7 is a perspective view of a user interface module of the LLM ranking generation and reporting system of the present invention displaying an input set-up window and a historical data window.

DETAILED DESCRIPTION OF THE INVENTION

Figure 1:
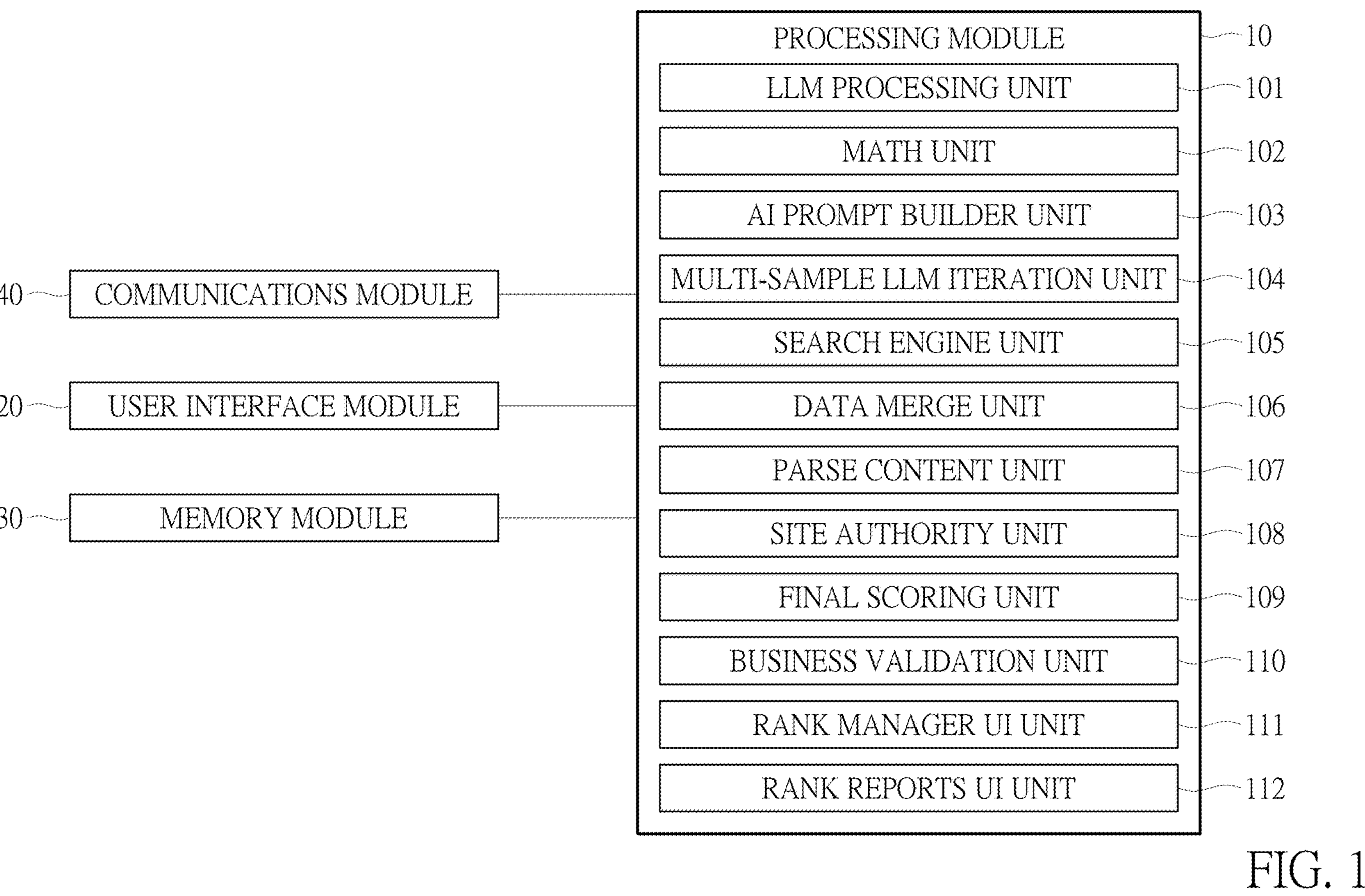
FIG. 1 is a block diagram of a large language model (LLM) ranking generation and reporting system of the present invention.

With reference to FIG. 1, a large language model (LLM) ranking generation and reporting system of the present invention includes a processing module 10, a user interface module 20, a memory module 30, and a communications module 40. The processing module 10 is electrically connected to the user interface module 20, the memory module 30, and the communications module 40.

The user interface module 20 is a hardware interface for the processing module 10 to interact with a user of the present invention, i.e. to receive an input from the user and to correspondingly generate an input signal to the processing module 10, or to notify the user about an information obtained by the processing module 10 of the present invention. In an embodiment, the user interface module 20 includes a display, a keyboard, and a mouse for a computer device. In a current embodiment, the user interface module 20 is a touch screen of a computer device.

The communications module 40 is connected to an internet, and the communications module 40 is configured to communicate with an LLM server through the internet in order to access an LLM on the LLM server. The ranking generation and reporting system of the present invention presents a novel and innovative method of smart utilizing the LLM to solve the problem of lacking a quantitative analysis on how much noise or variation a generated answer pooled from the LLM has.

The memory module 30 of the present invention stores a number n, wherein n is a positive integer greater than one that represents a number of times the processing module 10 of the present invention intends to query the LLM through the communications module 40.

In order to better understand how the processing module 10 of the present invention queries the LLM and quantifies a confidence of an answer returned by the LLM, the processing module 10 can be functionally identified as having a plurality of software units working in cooperation with one another. The software units of the processing module 10 together govern the processing module 10 to execute an LLM ranking generation and reporting method of the present invention.

The software units of the processing module 10 include an LLM processing unit 101 and a math unit 102. The LLM processing unit 101 handles the LLM querying process by running the prompt through the LLM for multiple iterations and gathering the results. The results gathered by the LLM processing unit 101 would then eventually pass down to the math unit 102. The math unit 102 handles calculation locally for aggregating and processing the raw output of the LLM. The metrics of how the math unit 102 calculates would be explained in later parts of the detailed description.

Figure 2:
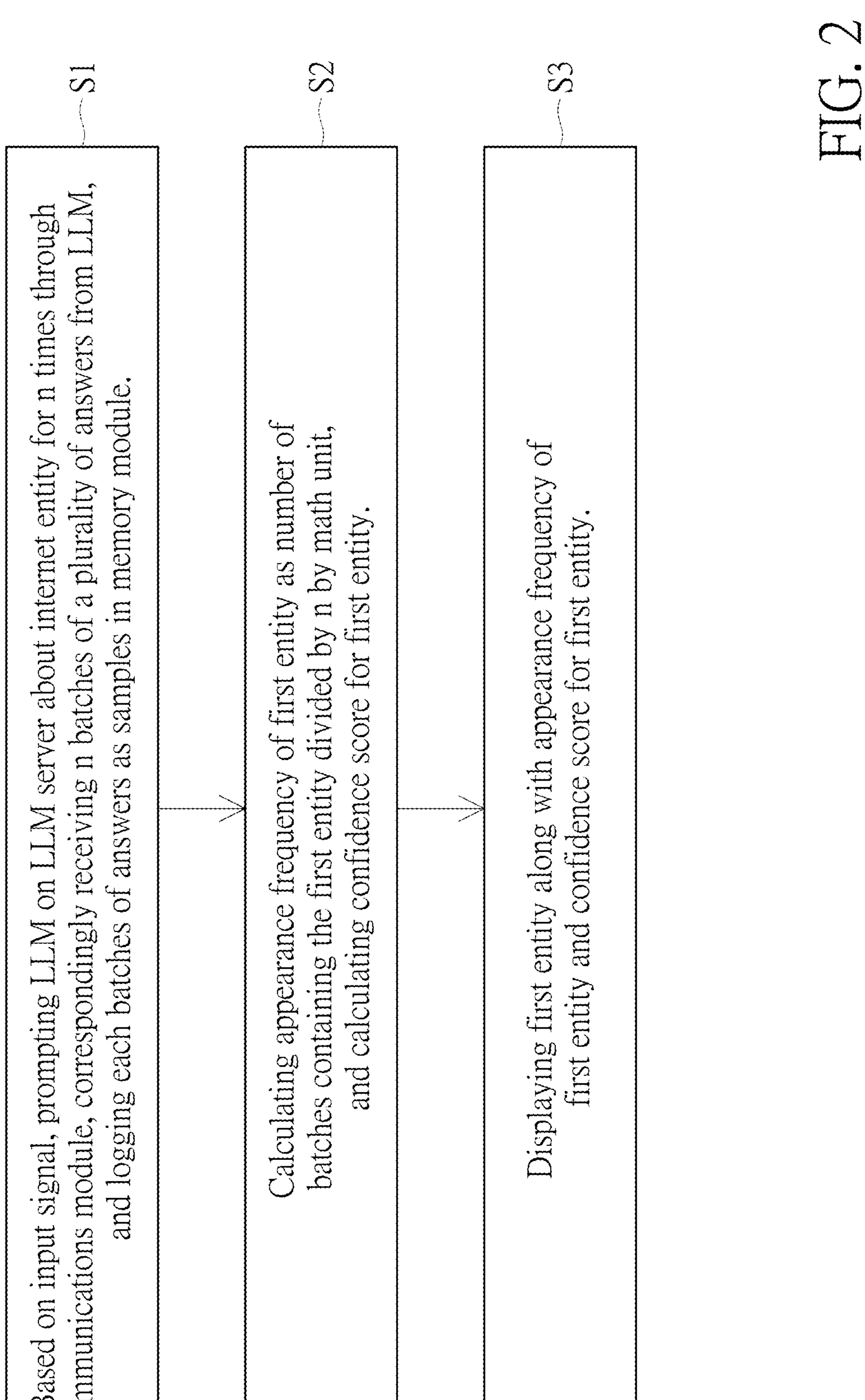
FIG. 2 is a flow chart of steps executed by a processing module of the LLM ranking generation and reporting system of the present invention.

With further reference to FIG. 2, when the processing module 10 receives the input signal through the user interface module 20, the processing module 10 executes the following steps of the LLM ranking generation and reporting method:

step S1: based on the input signal, prompting the LLM on the LLM server about an internet entity for n times through the communications module 40, correspondingly receiving n batches of a plurality of answers from the LLM, and logging each of the batches of the answers as samples in the memory module 30; wherein the LLM processing unit 101 accesses the LLM through the communications module 40 to request for the answers from the LLM, and the answers received from the LLM includes a first entity;

step S2: calculating an appearance frequency of the first entity as a number of batches containing the first entity divided by n by the math unit 102, and calculating a confidence score for the first entity;

step S3: displaying the first entity along with the appearance frequency of the first entity and the confidence score for the first entity through the user interface module 20.

By prompting the LLM n times for gathering multiple samples of response, then by analyzing the samples of response to determine the appearance frequency and the confidence score of the responses, the present invention is able to quantitatively inform a user about the certainties (or uncertainties) of having an answer with the first entity. In the words, the present invention is able to quantify the confidence of an answer as the confidence score by multi-sampling the LLM's responses and analyzing the samples of the responses, thus providing the user additional insights for the internet entity. For example, in an embodiment, the LLM on the LLM server that cooperates with the present invention is ChatGPT (GPT), and more particularly, the LLM is of GPT-4 version. The processing module 10 accesses the GPT's application programming interface (API) through the communications module 40. Without the integration of LLM ranking generation and reporting system of the present invention, GPT-4 itself lacks a smart feature to conduct a multiple-prompts-sampling operation about the internet entity for the benefit of gaining confidence-related insight about the internet entity. However, with the smart integration of the LLM ranking generation and reporting system of the present invention, a currently existing LLM such as GPT-4 is able to be utilized according to a logic vector provided by the present invention to generate and to provide unprecedented insights for the internet entity.

The aforementioned logic vector includes a series of prompt commands for the LLM with a plurality of logics, which overall resemble a prompt structure, or a logic structure of how to prompt the LLM in many iterations for achieving a specific goal and result. The many iterations of prompting the LLM may be interpreted as having a plurality of vector loops in the prompt structure.

In an embodiment, the memory module 30 stores a plurality of prompt structure files. These prompt structure files provide different alternatives for adopting different logic structures to prompt the LLM. One of the prompt structure files is an alternative prompt structure file. When the processing module 10 executes the alternative prompt structure file, the processing module 10 queries the LLM about the internet entity following a different set of steps detailed in the alternative prompt structure file for generating large variations in the answers for the internet entity. All of the prompt structure files contain the steps S1 to S3 as overall generic steps of the LLM ranking generation and reporting method for the processing module 10 to execute. By using different prompt structure files to prompt the LLM, the answers returned by the LLM may vary more significantly, thus providing variations to the answers obtained. This is particularly useful when the user has a need to comprehend a spectrum of the answers corresponding to the input signal.

In an embodiment, the user may customize the input through the user interface module 20 to specify a keyword, a location, a language, or a brand relating to the internet entity, thus narrowing down a scope of the queries for the LLM. Furthermore, the answers returned by the LLM include a plurality of entities, with the first entity being one of the entities. In this embodiment, the processing module 10 analyzes each of the entities and queries the LLM about each of the entities. However, since these steps to evaluate each of the entities are complicated and complex, the present invention primarily focuses on explaining how the processing module 10 provides the user with analysis about the first entity, as a demonstration of how the processing module 10 is capable of providing analysis equally to any of the entities.

In a case that the user specifies the keyword, the location, the language, and the brand relating to the internet entity, the input signal outputted by the user interface module 20 correspondingly includes a keyword information, a location information, a language information, and a brand information relating to the internet entity. The processing module 10 filters out the entities that mismatch the keyword information, the location information, the language information, and the brand information, thus narrowing down the scope of the queries for the LLM and filtering out un-related answers. This filtering step is one of the many ways the processing module 10 of the present invention filters out hallucinations of the LLM, such as GPT-4. As a result, the processing module 10 exclusively considers the answers that are indeed relevant to the internet entity.

As shown in FIG. 1, the software units of the processing module 10 also include an AI prompt builder unit 103 and a multi-sample LLM iteration unit 104.

The AI prompt builder unit 103 constructs and fine-tunes the prompts fed into the LLM to ensure the answers returned by the LLM are indeed helpful, insightful, and meaningful for the user. To achieve this, the AI prompt builder unit 103 constructs and fine-tunes the prompts with steps of initial filtering, source evaluating, cross-referencing, and feedback-selecting. The initial filtering step cleans and removes the query, that is, the input signal, from irrelevant elements. The irrelevant elements may be redundant words, redundant punctuations, or semantics that mismatches the keyword information, the location information, the language information, or the brand information. The source evaluating step checks the validity of the data sources used by the LLM and ranks their reliability. The cross-referencing step compares different sources or answers to assess consistency. The feedback-selecting step takes a user feedback signal received from the user interface module 20 into account to refine or improve a final prompt for querying the LLM.

The multi-sample LLM iteration unit 104 enhances accuracy of the answers returned by the LLM by running multiple prompt iterations. By querying the LLM n times, the LLM would be able to generate diverse outputs, thus providing different degrees of variability in model predictions. Overall, the LLM processing unit 101, the AI prompt builder unit 103 and the multi-sample LLM iteration unit 104 work closely together to prompt the LLM for multiple times.

In an embodiment, when prompting the LLM on the LLM server about the internet entity for n times, the AI prompt builder unit 103 and the multi-sample LLM iteration unit 104 use a same prompt to query the LLM about the internet entity. In this case, the processing module 10 would be able to gather samples of the answers accounting for a variability of the same prompt.

For example, if the input signal of "what is the best laptop in 2023" is received by the processing module 10, initial filtering of the input signal May modify the query for the LLM as "best laptop in 2023" to remove redundant words. The query "best laptop in 2023" is prompted for n times with the LLM, and the n batches of the answers returned by the LLM give samples accounting for the variability of "best laptop in 2023".

In another embodiment, when prompting the LLM on the LLM server about the internet entity for n times, the AI prompt builder unit 103 and the multi-sample LLM iteration unit 104 generate a plurality of variation prompts relating to the input signal through the LLM, and then correspondingly use the variation prompts to query the LLM about the internet entity. In this case, the processing module 10 would be able to gather samples of the answers accounting for a variability of multiple different prompts.

For example, if the input signal of "best laptop in 2023" is received by the processing module 10, the AI prompt builder unit 103 and the multi-sample LLM iteration unit 104 may first query the LLM to generate different variation prompts such as "best 2023 laptop" or "laptop best in 2023" etc. These variation prompts are then used as different queries to prompt the LLM for n times, and the n batches of the answers returned by the LLM give samples accounting for the variability of multiple different prompts such as "best laptop in 2023", "best 2023 laptop", or "laptop best in 2023" etc.

When executing the LLM ranking generation and reporting method, the processing module 10 calculates the confidence score by using several approaches.

In an embodiment, the processing module 10 calculates the confidence score by purely using the LLM to generate its confidence measurements. Each time when the processing module 10 prompts the LLM on the LLM server about the internet entity, the AI prompt builder unit 103 of the processing module queries the LLM to generate an LLM confidence level for having the first entity based on cross-checking the answers in the same batch. When logging each of the batches of the answers in the memory module 30, the LLM confidence levels for having the first entity are also logged, and the processing module 10 tracks the LLM confidence levels for having the first entity to dynamically adjust the confidence score calculated for the first entity.

With reference to FIG. 3, in another embodiment, the processing module 10 calculates the confidence score by purely using a statistical approach to generate its confidence measurements. The memory module stores a sample threshold, and the sample threshold is used to determine whether a sample size of n is great enough to be considered having a big sample size. In this statistical approach, when calculating the confidence score for the first entity, the math unit 102 executes the following steps:

- step S21: determining whether n is greater than or equal to the sample threshold;
- step S22: when n is greater than or equal to the sample threshold, using a normal approximation formula of a binomial distribution to calculate a confidence interval, and using the confidence interval to represent the confidence score; and
- step S23: when n is less than the sample threshold, using a Wilson score interval to calculate the confidence interval, and using the confidence interval to represent the confidence score.

The normal approximation formula of the binomial distribution mentioned in step S22 includes:

$$Pi = k/n$$

$$\mathrm{Var}(Pi) = Pi*(1-Pi)/n$$

$$\sigma(Pi) = \sqrt{Pi*(1-Pi)/n} = \sqrt{\mathrm{Var}(Pi)}$$

$$CI = Pi \pm (z*\sigma(Pi))$$

wherein Pi is an estimated probability of the first entity appearing in any single iteration of prompting the LLM, n is the number of iterations for prompting the LLM, k is the number of iterations that corresponds to the LLM returning a batch of answers that includes the first entity, Var(Pi) is the variance of Pi, σ(Pi) is the standard deviation of Pi, z is the z-score corresponding to the desired confidence level of a normal (Gaussian) distribution, and the CI is the confidence interval. For example, for a desired confidence level of 95% confidence corresponds to a z-score of 1.96.

Furthermore, in terms of the confidence score that is represented as the confidence interval, an upper boundary of the confidence interval is:

$$CI = Pi + (z*\sigma(Pi))$$

and a lower boundary of the confidence interval is:

$$CI = Pi - (z*\sigma(Pi))$$

a confidence width of the confidence interval is:

$$CI\mathrm{Width} = (Pi + (z*\sigma(Pi))) - (Pi - (z*\sigma(Pi))) = 2*(z*\sigma(Pi))$$

wherein CIWidth is the confidence width.

The Wilson score interval mentioned in step S23 is calculated with the following formula:

$$CI\mathrm{Wilson} = \frac{Pi + \frac{z^2}{2n} \pm \left(z*\sqrt{\frac{Pi(1-Pi)}{n} + \frac{z^2}{4n^2}}\right)}{1 + \frac{z^2}{n}}$$

wherein CIWilson is the Wilson score interval. An upper boundary of the Wilson score interval is:

$$CI\mathrm{Wilson} = \frac{Pi + \frac{z^2}{2n} + \left(z*\sqrt{\frac{Pi(1-Pi)}{n} + \frac{z^2}{4n^2}}\right)}{1 + \frac{z^2}{n}}$$

and a lower boundary of the Wilson score interval is:

$$CI\mathrm{Wilson} = \frac{Pi + \frac{z^2}{2n} - \left(z*\sqrt{\frac{Pi(1-Pi)}{n} + \frac{z^2}{4n^2}}\right)}{1 + \frac{z^2}{n}}$$

a confidence width of the Wilson score interval is:

$$CI\mathrm{WilsonWidth} = \frac{2*\left(z*\sqrt{\frac{Pi(1-Pi)}{n} + \frac{z^2}{4n^2}}\right)}{1 + \frac{z^2}{n}}$$

wherein CIWilsonWidth is the confidence width of the Wilson score interval.

Figure 4:
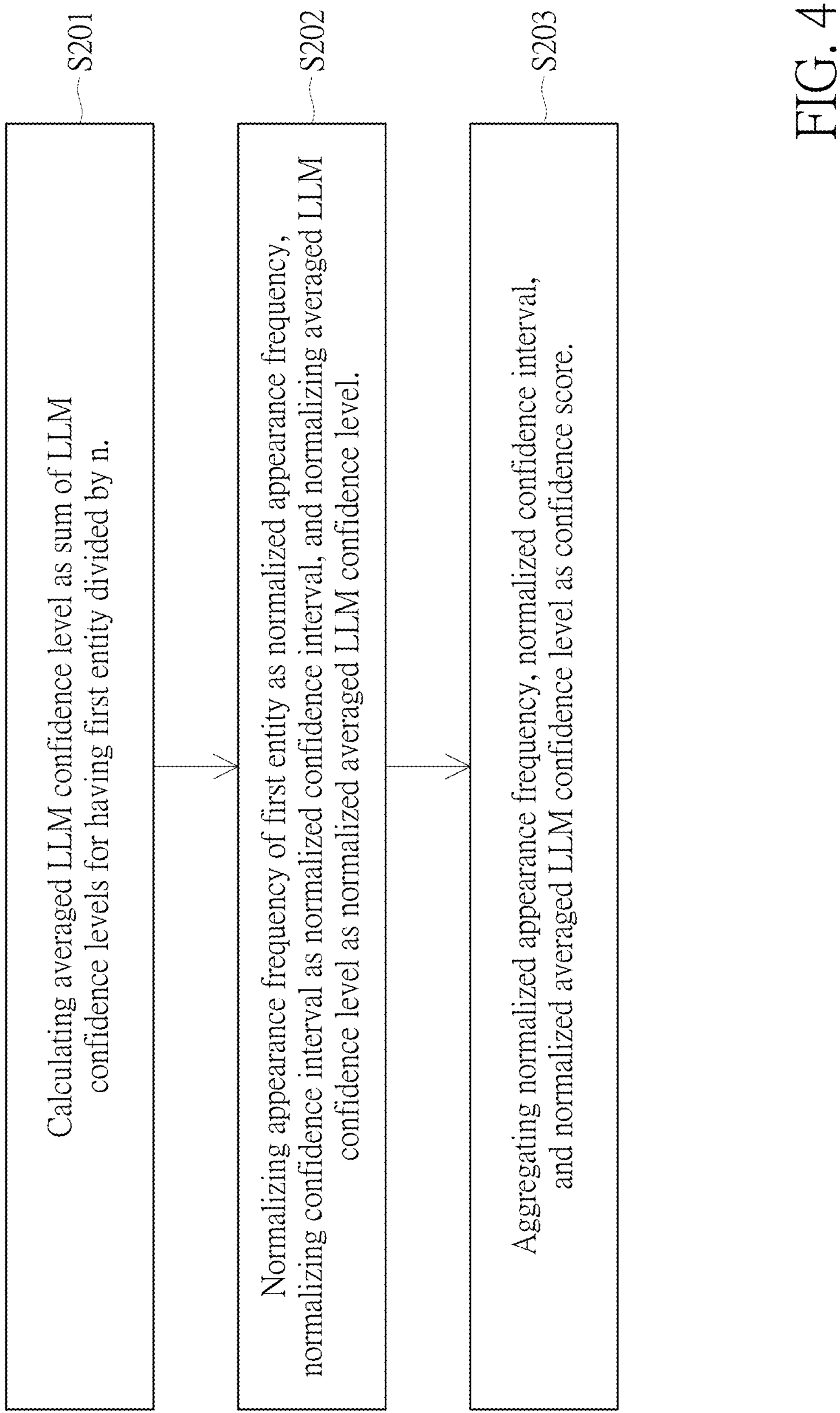
FIG. 4 is another flow chart of steps executed by the processing module of the LLM ranking generation and reporting system of the present invention.

With reference to FIG. 4, in yet another embodiment, the processing module 10 calculates the confidence score by using a hybrid of the LLM and the statistical approach to generate its confidence measurements. The hybrid is governed by a percentage stored in the memory module 30, or a weight stored in the memory module 30, of how proportionately the LLM and the statistical approach each should contribute to the calculation of the confidence score.

In this embodiment, each time when prompting the LLM on the LLM server about the internet entity, the AI prompt builder unit 103 queries the LLM to generate an LLM confidence level for having the first entity based on cross-checking the answers in the same batch. When logging each of the batches of the answers in the memory module 30, the LLM confidence levels for having the first entity are also logged. Furthermore, when the math unit 102 determines that n is greater than or equal to the sample threshold, the math unit 102 uses the normal approximation formula of the binomial distribution to calculate the confidence interval, and when the math unit 102 determines that n is less than the sample threshold, the math unit 102 uses the Wilson score interval to calculate the confidence interval.

In this embodiment, when calculating the confidence score for the first entity, the math unit 102 executes the following steps:

step S201: calculating an averaged LLM confidence level as a sum of the LLM confidence levels for having the first entity divided by n;

step S202: normalizing the appearance frequency of the first entity as a normalized appearance frequency, normalizing the confidence interval as a normalized confidence interval, and normalizing the averaged LLM confidence level as a normalized averaged LLM confidence level; and step S203: aggregating the normalized appearance frequency, the normalized confidence interval, and the normalized averaged LLM confidence level as the confidence score.

The normalized appearance frequency is calculated as:

$$(pi - \min(p))/(\max(p) - \min(p))$$

wherein pi is an averaged appearance frequency of the first entity, min(p) is a minimum frequency in the dataset, and max(p) is a maximum frequency in the dataset. The dataset includes m sets of data, and m is a positive integer greater than one. For each set of data, the present invention queries the LLM n times for obtaining n batches of the answers. In other words, cross the m sets of data, in order to evaluate an overall trend for the appearance frequency of the first entity, the normalized appearance frequency is calculated.

The normalized averaged LLM confidence level is calculated as:

$$(GPTCn - \min(GPTCn))/(\max(GPTCn) - \min(GPTCn))$$

wherein GPTCn is the averaged LLM confidence level, min(GPTCn) is a minimum averaged LLM confidence level in the dataset, and max(GPTCn) is a maximum averaged LLM confidence level in the dataset. The data set here also refers to the m sets of data.

When normalizing the confidence interval, the math unit 102 executes the following steps:

calculating the confidence width as the upper boundary of the confidence interval minus the lower boundary of the confidence interval;

calculating the normalized confidence interval as:

$$1 - (CI\text{Width} - \min(CI\text{Width}))/(\max(CI\text{Width}) - \min(CI\text{Width}))$$

wherein CIWidth is an averaged confidence width, min (CIWidth) is a minimum confidence width in the dataset, and max(CIWidth) is a maximum confidence width in the dataset.

Please consider the following table for an example:

TABLE 1

| | appearance frequency (Pi): | confidence interval (CI): | averaged LLM confidence level (GPTCn): |
|---|---|---|---|
| 1st set of data | 18/20 | 0.13 | 95% |
| 2nd set of data | 20/20 | 0.00 | 90% |
| 3rd set of data | 19/20 | 0.09 | 93% |
| | normalized appearance frequency (NPi): | normalized confidence interval (NCI): | normalized averaged LLM confidence level (NGPTCn): |
| Overall: | 0.50 | 0.56 | 0.53 |

In the example shown in table 1, n equals 20, m equals 3, and the normalized appearance frequency, the normalized confidence interval, and the normalized averaged LLM confidence level are calculated according to the aforementioned formulas. The aggregation of the normalized appearance frequency, the normalized confidence interval, and the normalized averaged LLM confidence level to the confidence score also depend on a weight data stored in the memory module 30 for specifying the proportion of how much each contributes to the confidence score.

The aforementioned technical features involve the generation of the confidence score. Apart from generating the confidence score, the present invention is also able to provide rank information about each of the entities included by the n batches of answers. In other words, in terms of the first entity that is included in the answers among other entities, the present invention not only provides the confidence score for the first entity, but also provides rank information about the first entity.

In an embodiment, each time when prompting the LLM on the LLM server about the internet entity, the AI prompt builder unit 103 also queries the LLM to generate a list order, whereby a position of appearance, or an order of appearance, of each of the entities from an LLM output is saved in the memory module 30, and thus the processing module 10 receives a rank data corresponding to the position of appearance of each of the entities, tracking a high rank, a low rank and an average rank for each of the entities outputted from the LLM through the LLM processing unit 10.

More particularly, as shown in FIG. 1, the software units of the processing module 10 also includes a search engine unit 105, a data merge unit 106, a parse content unit 107, a site authority unit 108, a final scoring unit 109, a business validation unit 110, a rank manager user interface (UI) unit 111, and a rank reports user interface (UI) unit 112. By working together, these software units of the processing module 10 ranks the entities in the answers, validates the authenticities of the referenced sources, such as validating a brand, a keyword, or a domain of a website referencing the first entity, merges/calculates the obtained results, and presents quantitative analytical data for the user.

In an embodiment, the internet entity is a website. In some of the vector loops of the prompt structure, when producing each batch of the answers, the AI prompt builder unit 103 uses the search engine unit 105 to search the user-specified keyword, location, language and/or brand of the website through a search engine of a search engine server, thereby acquiring real-time web data about the entities. The real-time web data of the entities are then used by the LLM for considerations of evaluating the authorities of the entities. The data merge unit 106 thus correspondingly receives the LLM output from the LLM that considers a search result list of websites with influences from the real-time web data. For a vector loop among many vector loops, the LLM output is the answer obtained from the LLM, and the LLM output contains the search result list of websites.

In some vector loops, each time when the processing module 10 receive the search result list, the parse content unit 107 parses through contents of select search results of the websites on the search result list, to determine a relevance of the websites in the search result list to each of the entities, and to rank the entities according to orders of appearances from the LLM output referenced by the websites in the search result list, through a query sent to the LLM through the communications module 40 for processing. Thus, the processing module 10 receives a rank data, detailing the high rank, the low rank, and the average rank for each of the entities outputted from the LLM through the multi-sample LLM iteration unit 104 through the communications module 40.

When the parse content unit 107 parses through the websites, the site authority unit 108 provides the LLM with a list of domains/brands of the websites, an authority of each of the domains/brands, and to associate the domains/brands to the entities with the relevance of the websites to each of the entities, and thus, the processing module 10 accordingly receives an external confidence value from the LLM.

In some vector loops, the site authority unit 108 of the present embodiment provides the LLM with the authority of each domain from the search engine unit 105, according to metrics established by page rank or domain authority. The LLM may obtain these metrics either by accepting the metrics outputted by the communications module 40 of the present invention or by directly accessing the metrics online from page rank or domain authority, such as from a website like ahrefs.com.

Among the websites on the search result list, some websites may be categorized as top-authority websites. These top-authority websites can be understood as well-known established websites that server as directories to an entity such as the first entity. For example, if the first entity is a specific restaurant, the top-authority websites that may reference the specific restaurant could be a famous food blog, a popular search engine, or Google Map reviews. These top-authority websites carry significant weights of importance (for credential and authenticity) for the first entity, and are thus worth significant consideration for the processing module 10 to query the LLM to rank the first entity.

In some vector loops, the search engine unit 105 provides the LLM with the search result list of websites. After sending the search result list of websites to the AI prompt builder unit 103, and after gathering the LLM outputs over multiple iterations, the processing module 10 produces a finalized result that is stored as a JSON file in the memory module 30. The processing module 10 may easily transfer the JSON file across different platforms. The JSON file is able to store websites' uniform resource locators (URLs), business information, probability calculations, appearance, iterations, confidence scores, high rank, low rank, average rank, rank score, language, location, and other calculated data in a well-structured list, which makes each stored data structure easy to access across different platforms.

When the URLs are accessed by the parse content unit 107, the parse content unit 107 queries the LLM to parse through each of the websites through the URLs. After the parse content unit 107 queries the LLM to parse through the websites, the LLM might return error codes when having problems accessing the websites. For example, if a web page of a website is non-existent, the LLM would obtain an error code of "404" corresponding to "page not found", and the LLM would return the error code to the present invention detailing the abnormal situation. As a result, after the parse content unit 107 provides the query to the LLM to parse through the URLs, the data merge unit 106 executes the following steps:

- when receiving an error code from accessing one of the websites, excluding the website associated with the error code from the search result list; and
- when determining that one of the websites is included more than once in the search result list, excluding duplications of the website from the search result list.

By doing so, the present invention filters out statistical noises of these non-existent or abnormal websites to prevent these noises from affecting the statistical calculations conducted from the search result list, hence allowing the rank of entities, such as a rank of the first entity, to be more accurately calculated.

Continuing on the aforementioned example, the processing module 10 may execute the LLM ranking generation and reporting method for m times to collect m sets of data, and for obtaining each set of data, the processing module 10 queries the LLM for n times, thus obtaining n batches of answers. In an embodiment, for each set of data, the processing module 10 calculates a rank score that represents an overall rank for each of the entities, including a rank for the first entity, after collecting and analyzing the logs of n batches of data. In other words, after the processing module 10 executes the LLM ranking generation and reporting method for m times, the processing module 10 would have obtained m independent calculations of the rank score.

In this embodiment, the memory module 30 stores an appearance frequency weight, a probability weight, a confidence weight, and an external data weight. The appearance frequency weight, the probability weight, the confidence weight, and the external data weight are all normalized. To demonstrate how the processing module 10 calculates the rank score for any of the entities included in the search result list, the following presents an example of how the rank score for the first entity is calculated.

For each set of data, the processing module 10 receives the search result list, and each time when the processing module 10 receives the search result list, the math unit 102 of the processing module 10 calculates the rank score for the first entity as:

$$\text{Rank score} = (NPi * \text{the appearance frequency weight}) + (NCI * \text{the probability weight}) + (NGPTCn * \text{the confidence weight}) + (ECnV * \text{the external data weight});$$

wherein NPi is the normalized appearance frequency, NCI is the normalized confidence interval, NGPTCn is the normalized averaged LLM confidence level, and ECnV is the external confidence value received from the LLM. In other words, the rank score takes into account both the LLM's assessment and the present invention's own statistical assessments of confidence and rank of the first entity across the n batches of answers in a single set of data.

The present invention also allows for the user to modify these weights stored in the memory module 30 for changing how proportionately the rank score should be calculated. More particularly, when the user interface module 20 receives a weight change signal, the processing module 10 adjusts at least one of the appearance frequency weight, the probability weight, the confidence weight, and the external data weight stored in the memory module 30 according to the weight change signal. This degree of freedom allows the user to flexibly customize calculations in a way most-suitable to the user's need for understanding an overall rank and confidence of the first entity online.

Since across m runs of the LLM ranking generation and reporting method the processing module 10 obtains m sets of data, and since these m sets of data are all logged and stored in the memory module 30 for record keeping, the present invention further demands a mechanism to evaluate each of the entities across the m runs. In other words, in terms of the first entity, m sets of data correspond to m different rank scores for the first entity, and a final scoring mechanism is introduced to take into account the fluctuations of the m different rank scores across m runs.

In the present embodiment, the memory module 30 further stores a final scoring weight data. After the math unit 102 calculates the rank score m times, wherein, as defined before, m is a positive integer greater than one, the memory module 30 stores a plurality of the rank scores for the first entity, a plurality of the appearance frequencies of the first entity, a plurality of the confidence intervals of the first entity, and the authorities of the domains/brands.

The final scoring unit 109 of the processing module 10 calculates a final score for the first entity by aggregating the rank scores for the first entity, the appearance frequencies of the first entity, the confidence intervals of the first entity, and the authorities of the domains/brands according to the final scoring weight data.

Please consider the following table for an example:

TABLE 2

| Key-word | Rank | Low Rank | High Rank | Prob. | Con. Score | Pi | External Data | Rank Score |
|---|---|---|---|---|---|---|---|---|
| Best Dentist NYC | 1 | 2 | 1 | 0.92 | 0.95 | 18/20 | Authority Site A | 95 |
| Best Dentist NYC | 2 | 3 | 1 | 0.88 | 0.90 | 16/20 | Authority Site B | 90 |
| Best Dentist NYC | 3 | 4 | 2 | 0.75 | 0.85 | 14/20 | User Reviews Avg | 88 |
| Best Dentist NYC | 4 | 5 | 3 | 0.70 | 0.80 | 12/20 | Social Media Feedback | 80 |
| Best Dentist NYC | 5 | 6 | 4 | 0.65 | 0.75 | 10/20 | Blog/ Review Site | 78 |

In the example presented in table 2, five sets of data for the first entity are collected and analyzed, and each sets of data corresponds to prompting the LLM twenty times for collecting twenty batches of answers. In other words, in this example m equals five, n equals twenty, and the first entity is a keyword “Best Dentist NYC”. For each set of data in table 2, “low rank” corresponds to the lowest order of appearance of the first entity from the LLM output, “high rank” corresponds to the highest order of appearance of the first entity from the LLM output, “prob.” corresponds to the averaged LLM confidence level of the first entity that is represented as a probability, “con. score” corresponds to the confidence score of the first entity, “Pi” corresponds to the estimated probability of the first entity appearing in any single iteration of prompting the LLM, “external data” corresponds to the top-authority website most-significantly contributed for the n batches of evaluation for the first entity, and “rank score” corresponds to the rank score calculated for the first entity for the n batches of answers. Moreover, “rank” corresponds to the processing module 10 ranking the m sets of data according to the rank score in descending order. In other words, since among the m sets of data, 95 is the highest rank score and 90 is the second highest rank score, the set of data corresponding to the rank score of 95 is ranked number one for “rank”, and the set of data corresponding to the rank score of 90 is ranked number two for “rank”, etc.

Furthermore, to ensure a validity of the input signal used for querying the LLM is valid, the processing module 10 uses the business validation unit 110 to determine whether the input signal is normal.

For example, the internet entity of the input signal is a website, and the input signal includes a website information. By accessing the internet through the communications module 40, the business validation unit 110 determines whether the website corresponding to the website information exists on the internet. When the website corresponding to the website information is non-existent on the internet, the business validation unit 110 outputs a website error information to the memory module 30 and the user interface module 20, thus informing the user that the website of interest is non-existent. When the website corresponding to the website information is existent on the internet, then the processing module 10 proceeds to use the AI prompt builder unit 103 to initiate prompting the LLM.

For example, the internet entity of the input signal may also be an element of a website, such as a brand of a website, a keyword of a website, or a domain of a website, etc. In this example, the internet entity of the input signal is a brand of a website, and the input signal includes a brand information. By accessing the internet through the communications module 40, the business validation unit 110 determines whether the brand corresponding to the brand information exists on the internet. When the brand corresponding to the brand information is non-existent on the internet, the business validation unit 110 outputs a brand error information to the memory module 30 and the user interface module 20, thus informing the user that the brand of interest is non-existent. When the brand corresponding to the brand information is existent on the internet, then the processing module 10 proceeds to use the AI prompt builder unit 103 to initiate prompting the LLM.

Figure 5:
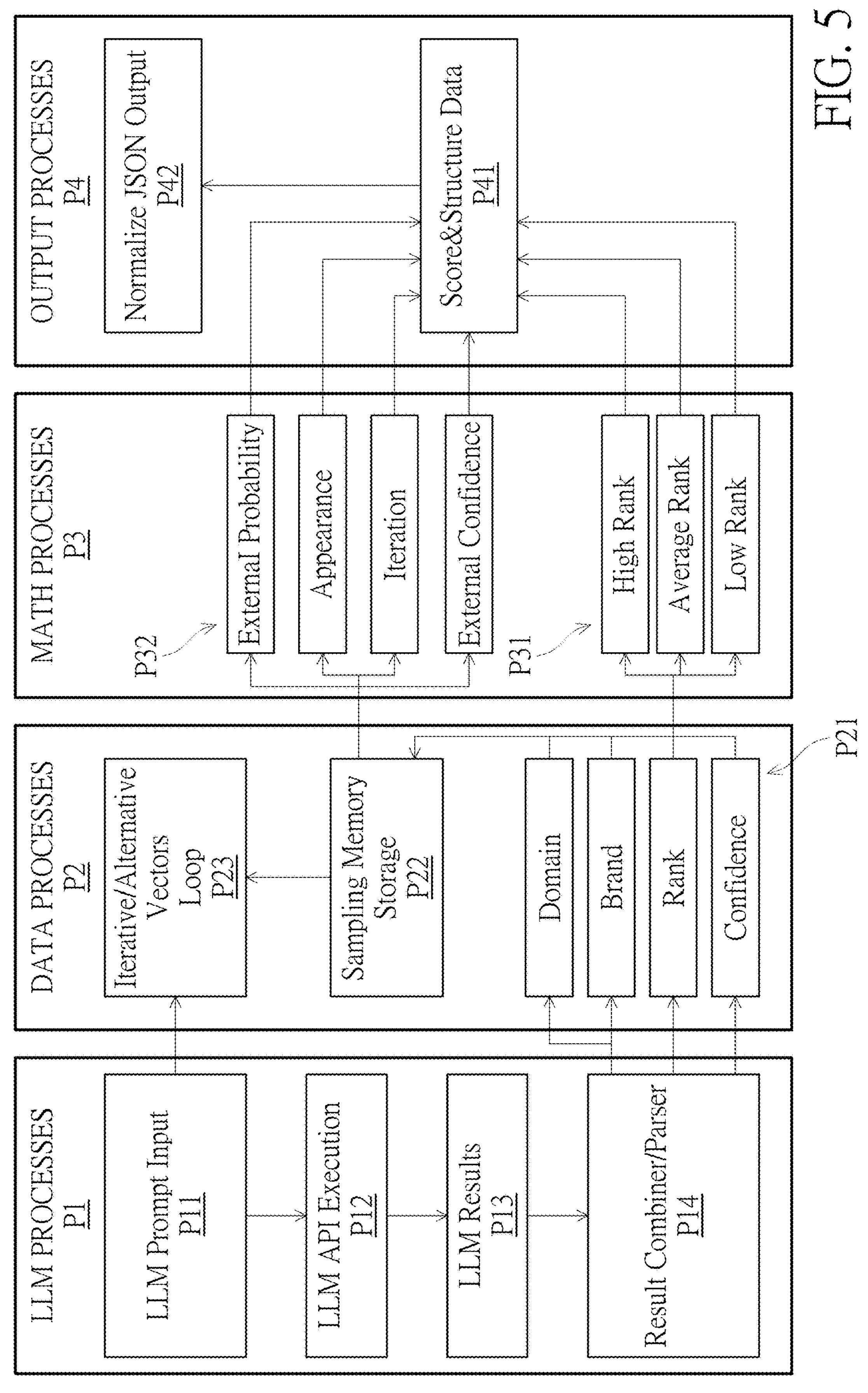
FIG. 5 is a flow chart of processes executed by the processing module of the LLM ranking generation and reporting system of the present invention.

With reference to FIG. 5, FIG. 5 provides a perspective view of how overall the processing module 10 cooperates with the LLM to execute the LLM ranking generation and reporting method of the present invention. The cooperation of the processing module 10 with the LLM may be categorized into steps under a set of LLM processes P1, a set of data processes P2, a set of math processes P3, and a set of output processes P4.

The set of LLM processes P1 includes:

- process P11: prompting the LLM with a prompt corresponding to the input signal through the LLM's API;
- process P12: allowing the LLM's API to execute the prompt, thus the LLM accepting the query from the processing module 10 inquiring about the internet entity;
- process P13: receiving the answers outputted from the LLM;
- process P14: parsing through the answers and combining results of the answers, thus extracting the entities in the answers and sending the answers along with the extracted entities to the set of data processes P2, wherein the answers includes the first entity.

The set of data processes P2 includes:

- process P21: receiving the answers along with the extracted entities, and analyzing the entities in terms of domain references, brand references, ranks, and confidences for generating a rank score for each of the entities, then outputting the rank scores;
- process P22: logging the entities along with their rank scores as samples in the memory module 30, thus allowing memory storage of the memory module 30 to be used for sampling the answers;
- process P23: following the logic vector assigned for the processing module 10, attempting to iteratively prompt the LLM with a looping logic structure, thus assigning the prompt for executing process P11 in another iteration.

The set of math processes P3 includes:

- process P31: receiving the rank scores of the entities, and storing a rank of each of the entities into a low rank corresponding to the lowest order of appearance, a high rank corresponding to the highest order of appearance, and an average rank corresponding to an averaged order of appearance for each of the entities in order of the LLM output;
- process P32: accessing logs about the entities with their rank scores from the memory module 30, and analyzing each of the entities, thus for each of the entities, obtaining the normalized appearance frequency, the normalized confidence interval, the normalized averaged LLM confidence level, and the external confidence value.

The set of output processes P4 includes:

process P41: taking into account the low rank with the lowest order of appearance, the average rank with the averaged order of appearance, and the high rank with the highest order of appearance for each of the entities, and for each of the entities, aggregating the normalized appearance frequency, the normalized confidence interval, the normalized averaged LLM confidence level, and the external confidence value with appropriate weights to generate a final score for each of the entities, then structuring data containing the final scores and the entities to present to a user;

process P42: normalizing and storing the data containing the final scores and the entities as a finalized result in a JSON file in the memory module 30, and outputting the JSON file into another platform.

The aforementioned another platform may be a software platform or a hardware device. The finalized result, among many finalized ranked information, contains the final score for the first entity. The average rank for each of the entities is calculated in this embodiment to provide the user with additional rank information regarding each of the entities apart from the high rank and the low rank for each of the entities.

Figure 6:
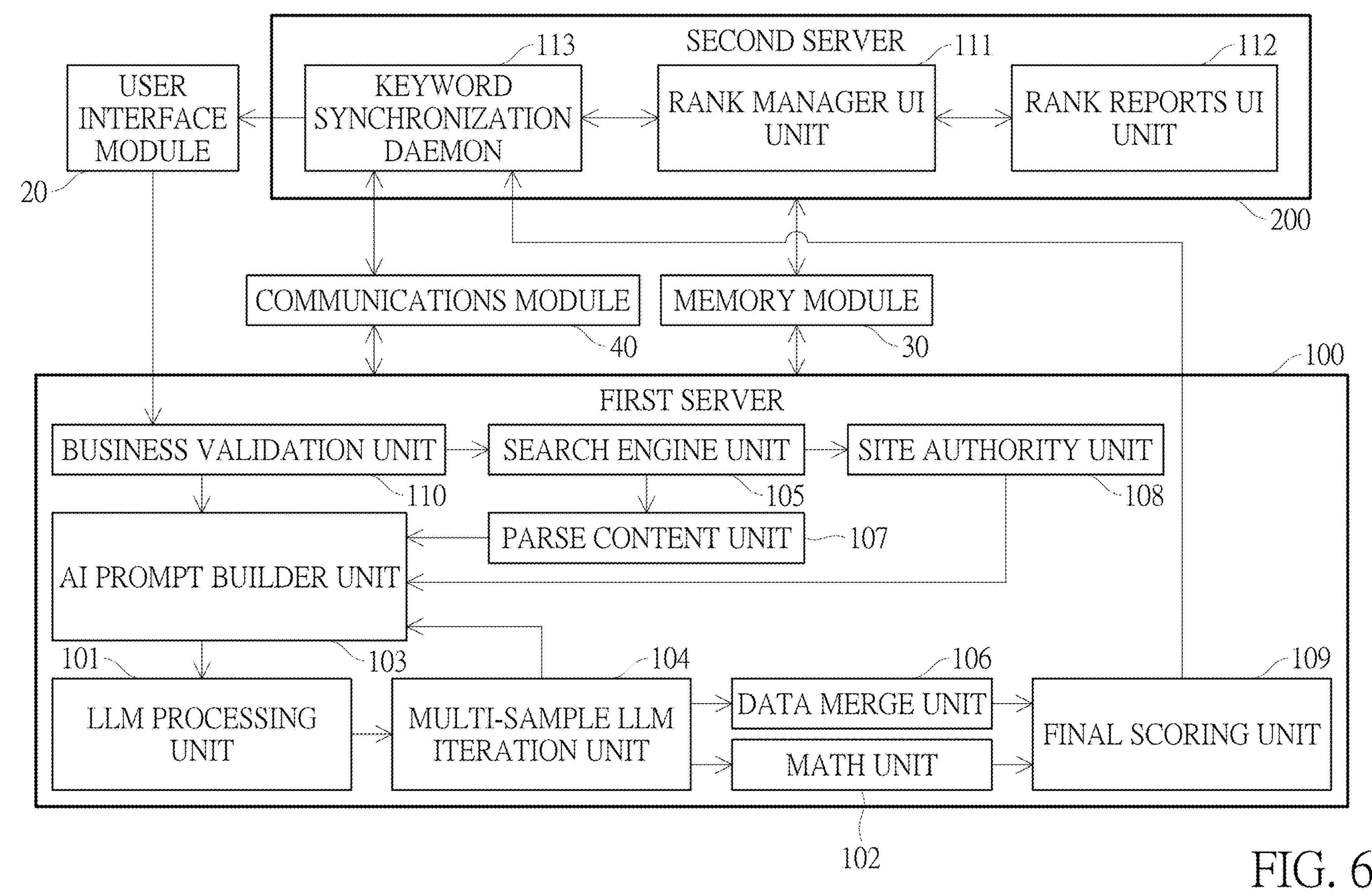
FIG. 6 is a block diagram of an embodiment of the LLM ranking generation and reporting system of the present invention.

With reference to FIG. 6, in an embodiment of the present invention, the processing module 10 is separated into two different physical servers-a first server 100 and a second server 200.

The first server 100 and the second server 200 communicate through the communications module 40 over a network across distance, and both the first server 100 and the second server 200 also accesses the memory module 30 and the user interface module 20.

The first server 100 includes the LLM processing unit 101, the math unit 102, the AI prompt builder unit 103, the multi-sample LLM iteration unit 104, the search engine unit 105, the data merge unit 106, the parse content unit 107, the site authority unit 108, the final scoring unit 109, and the business validation unit 110.

In this embodiment, apart from the second server 200 including the rank manager UI unit 111 and the rank reports UI unit 112, the second server 200 also includes a keyword synchronization (sync) daemon 113. The keyword sync daemon 113 bridges the second server 200 with the first server 100 by synchronizing the keyword information between the first server 100 and the second server 200. In other words, the first server 100 and the second server 200 are two different physical platforms for the processing module 10, and the keyword sync daemon 113 is configured to synchronize information across different physical or software platforms, so that information shared between the different platforms is free from mismatches. As the keyword information between the first server 100 and the second server 200 is synchronized, the processing module 10 may query the LLM consistently.

Figure 8:
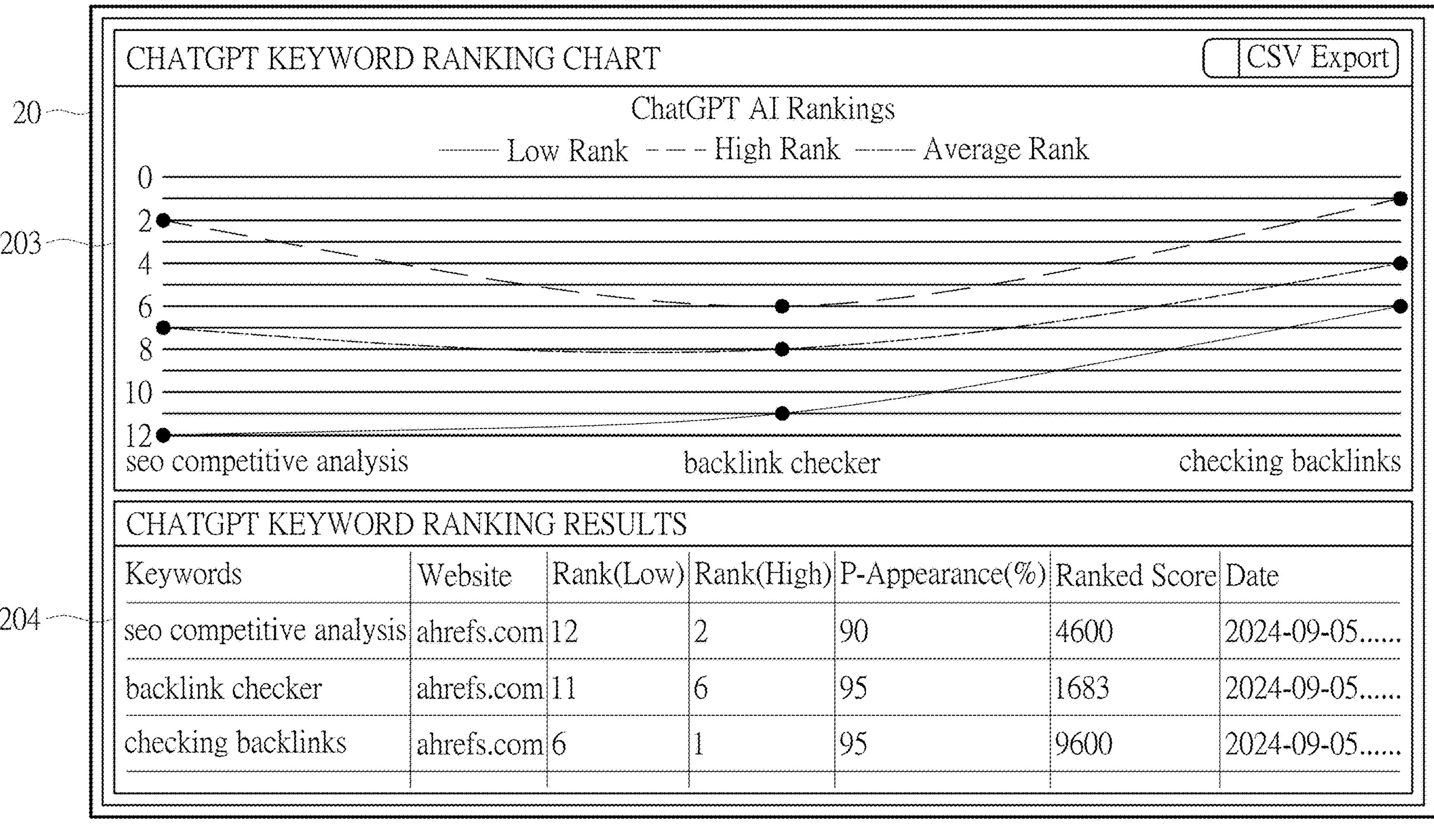
FIG. 8 is a perspective view of the user interface module of the LLM ranking generation and reporting system of the present invention displaying a visualization window and a rank result window.

With reference to FIG. 7 and FIG. 8, in the present embodiment, the processing module 10 records the input signal, the final score, a time information corresponding to the input signal, and other relevant information relating to the answer relating to querying the LLM as a historical data in the memory module 30. These stored historical data may be organized and structured by the processing module 10 to present information to the user via the user interface module 20 in a clear, easily-understandable manner.

In the present embodiment, the rank manager UI unit 111 of the processing module 10 controls the user interface module 20 to display an input set-up window 201 and a historical data window 202. The rank reports UI unit 112 of the processing module 10 controls the user interface module 20 to display a visualization window 203 and a rank result window 204.

The input set-up window 201 allows the user to customize information included in the input signal through using the user interface module 20. The historical data window 202 displays the historical data recorded in the memory module 30 through the user interface module 20. The visualization window 203 displays a visualized statistical representation figure corresponding to the rank data of the internet entity through the user interface module 20. The rank result window 204 displays the input signal and the rank data of the internet entity recorded in the memory module 30 through the user interface module 20. In this embodiment, the processing module 10 may also output information presented in these various windows into a CSV file. The CSV file allows the analytic data related to the input signal to be easily organized and presented across different physical and software platforms.

In another embodiment, the processing module 10 may create other forms of UI windows and display the UI windows through the user interface module 20 to present other various information stored in the memory module 30 about analytic results regarding the entities returned by the LLM for the queries about the internet entity. The input set-up window 201, the historical data window 202, the visualization window 203, and the rank result window 204 may also include additional functionalities to further enhance the user's engagement from the start of inputting the input signal through the user interface module 20 to see the analytic results related to the input signal presented by the user interface module 20.

The following provides supplemental information for understanding the underlining considerations that the present invention encompasses. Please consider the following table:

TABLE 3

| Aspect | Estimated Probability (Pi): | Confidence Interval (CI): |
|---|---|---|
| Definition: | A point estimate of the probability of an event occurring. | A range of values likely to contain the true probability with a certain confidence level. |
| Type of Estimate: | Point estimate (single value) | Interval estimate (range of values) |
| Purpose: | To estimate the likelihood of an event occurring based on observed data. | To quantify the uncertainty around the estimated probability and provide a range for the true probability. |
| Uncertainty Consideration: | Does not account for uncertainty; only provides a single estimate. | Accounts for uncertainty by providing a range that reflects the likely location of the true probability. |
| Use Case: | To represent the likelihood of an entity appearing in the model's output. | To provide a range in which the true probability of the entity appearing likely lies, reflecting how much data is available and how confident we are. |

Table 3 outlines the difference between a calculation of the estimated probability and a calculation of the confidence interval.

Please also consider the following table:

TABLE 4

| Aspect | GPT-4 Confidence (Implicit): | Statistical Confidence Interval: |
|---|---|---|
| Nature of Confidence: | Based on the probability distribution of tokens or entities at each step. | Based on sampling and accounts for uncertainty over multiple trials. |
| Calculation Method: | GPT-4 uses softmax probabilities to generate responses; "confidence" is tied to the probability of the next token. | Uses sample-based estimates (like binomial or normal distributions) to calculate ranges (intervals) of possible values. |
| Uncertainty Consideration: | GPT-4's "confidence" is purely based on the model's current understanding at each token. It does not track uncertainty or variance over multiple runs. | Confidence intervals explicitly measure uncertainty in estimates and provide ranges based on observed variability. |
| Probabilistic Nature: | GPT-4 provides probabilities for each possible next token, but it does not calculate the uncertainty over multiple generations. | Confidence intervals provide a range for the true value based on the sample size and variability in data. |
| Multiple Runs/Iterations: | Each run of GPT-4 is independent and does not track variability across runs unless explicitly done in an external system. | Confidence intervals rely on multiple runs/iterations to quantify uncertainty. |
| Feedback Mechanism: | GPT-4's confidence is based solely on learned patterns from its training data and internal scoring; it does not self-adjust based on variability over runs. | Confidence intervals are dynamic and reflect the variability in results over multiple iterations or samples. |

Table 4 outlines the difference between the LLM's mathematical process, such as GPT-4's mathematical process, for generating the answer and the mathematical process of the statistical calculation executed by the math unit 102 of the present invention.

To demonstrate an overall usage of the present invention, please consider the following example.

The LLM ranking generation and reporting system of the present invention is tasked to ran 5 runs querying the LLM about "who is the best dentist in New York". The following results (answers) are gathered:

Run 1: Dr. Smith, Dr. Patel, Dr. Johnson;

Run 2: Dr. Patel, Dr. Smith, Dr. Carter;

Run 3: Dr. Johnson, Dr. Patel, Dr. Carter;

Run 4: Dr. Smith, Dr. Johnson, Dr. Carter;

Run 5: Dr. Patel, Dr. Johnson, Dr. Smith.

Generally, the entities of the answers may be websites, people, or places, etc. In this particular example, the entities are Dr. Patel, Dr. Smith, Dr. Johnson, and Dr. Carter that are included over the multiple runs in the answers. The processing module 10 of the present invention tracks appearance frequency of each of the entities, thus concluding that:

Dr. Patel: Appeared 4 times;

Dr. Smith: Appeared 4 times;

Dr. Johnson: Appeared 4 times;

Dr. Carter: Appeared 3 times.

Using the gathered statistical logs of data, the processing module 10 estimates probabilities of each of the entities appearing in future runs:

$$\text{Dr. Patel: } pi = p\text{Patel} = 45 = 0.80;$$

$$\text{Dr. Smith: } pi = p\text{Smith} = 45 = 0.80;$$

$$\text{Dr. Johnson: } pi = p\text{Johnson} = 45 = 0.80;$$

$$\text{Dr. Carter: } pi = p\text{Carter} = 35 = 0.60.$$

The processing module 10 then calculates the confidence interval for each of the entities. The first entity may be any of the entities mentioned above. If, for example, the first entity is Dr. Patel, then the processing module 10 may calculate the confidence interval for Dr. Patel as:

$$CI(\text{Patel}) = 0.80 \pm 1.96 \cdot 0.80 \cdot (1 - 0.80)5 = [0.45, 1.00]$$

This means the present invention is 95% confident that the true probability of Dr. Patel being returned lies between 45% and 100%.

During each run, GPT-4 also assigns an internal probability (the LLM confidence level) to each dentist (representing how confident GPT-4 is about that dentist in the specific response). For example:

Run 1: GPT-4 assigns probabilities of 0.80 for Dr. Smith, 0.70 for Dr. Patel, and 0.60 for Dr. Johnson;

Run 2: GPT-4 assigns probabilities of 0.65 for Dr. Patel, 0.75 for Dr. Smith, and 0.55 for Dr. Carter.

After 5 runs, the processing module 10 of the present invention calculates average internal confidence (the averaged LLM confidence level) for each entity:

$$\text{Dr. Patel: } (0.70 + 0.65 + 0.80 + 0.85 + 0.90)/5 = 0.78;$$

$$\text{Dr. Smith: } (0.80 + 0.75 + 0.60 + 0.85 + 0.90)/5 = 0.78;$$

$$\text{Dr. Johnson: } (0.60 + 0.65 + 0.75 + 0.70 + 0.55)/5 = 0.65;$$

$$\text{Dr. Carter: } (0.55 + 0.60 + 0.50 + 0.45 + 0.55)/5 = 0.53.$$

Finally, based on the calculated statistical confidence (the appearance frequencies and the confidence intervals) and the calculated averaged LLM confidence level, the processing module 10 is able to combine the results into the following table:

TABLE 5

| Dentist: | Appearance Frequency: | Confidence Interval (at 95%): | Averaged GPT-4 Confidence (averaged LLM confidence level): |
|---|---|---|---|
| Dr. Patel: | 80% | [45%, 100%] | 0.78 |
| Dr. Smith: | 80% | [45%, 100%] | 0.78 |
| Dr. Johnson: | 80% | [45%, 100%] | 0.65 |
| Dr. Carter: | 60% | [30%, 90%] | 0.53 |

Once the information in Table 5 is presented to the user through a UI widow, the user of the present invention would not only qualitatively obtain that Dr. Patel and Dr. Smith are ranked highest as they both not only have the highest appearance frequencies, but also the highest overall confidence considering both the confidence interval and the averaged LLM confidence level.

Furthermore, to normalize the results across multiple sets of data, if assuming that the min appearance frequency is 0.50 (Dr. Carter) and the max appearance frequency is 0.80 (Dr. Patel and Dr. Smith), the normalized appearance frequencies can be calculated as:

$$\text{Dr. Patel: } (0.80-0.50)/(0.80-0.50)=1.00;$$

$$\text{Dr. Johnson: } (0.60-0.50)/(0.80-0.50)=0.33;$$

$$\text{Dr. Carter: } (0.50-0.50)/(0.80-0.50)=0.00.$$

If assuming the min confidence interval width is 0.55 (Dr. Patel and Dr. Smith) and the max confidence interval width is 0.60 (Dr. Carter), the normalized confidence interval can be calculated as:

$$\text{Dr. Patel: } 1-(0.55-0.55)/(0.60-0.55)=1.00;$$

$$\text{Dr. Carter: } 1-(0.60-0.55)/(0.60-0.55)=0.00.$$

Assuming the min averaged LLM confidence level is 0.53 (Dr. Carter) and the max averaged LLM confidence level is 0.78 (Dr. Patel and Dr. Smith), the normalized averaged LLM confidence level can be calculated as:

$$\text{Dr. Patel: } (0.78-0.53)/(0.78-0.53)=1.00;$$

$$\text{Dr. Carter: } (0.53-0.53)/(0.78-0.53)=0.00.$$

Using equal weights for aggregating the rank score, the rank score can be calculated as:

$$\text{Dr. Patel: } 1/3\cdot 1.00+1/3\cdot 1.00+1/3\cdot 1.00=1.00;$$

$$\text{Dr. Carter: } 1/3\cdot 0.00+1/3\cdot 0.00+1/3\cdot 0.00=0.00.$$

The processing module 10 then sorts the entities according to the rank score and can obtain that:

2 Dr. Patel: Rank 1 (rank score=1.00)

Dr. Smith: Rank 1 (rank score=1.00)

Dr. Johnson: Rank 3.

The processing module 10 may also generate a final score for each of the entities across different sets of data, and updates the ranks for each of the entities, providing a finalized overall ranking for each of the entities. As such, the present invention is able to innovatively provide both qualitative and quantitative analysis of the entities with considerations to both the LLM's output and the present invention's own statistical analysis.

What is claimed is:

1. A large language model (LLM) ranking generation and reporting system, comprising:

a user interface module;

a communications module, connected to an internet, and configured to communicate with an LLM server through the internet;

a memory module, storing a number n, wherein n is a positive integer greater than one; and a processing module, electrically connected to the user interface module, the communications module, and the memory module;

wherein the processing module comprises an LLM processing unit and a math unit; when the processing module receives an input signal through the user interface module, the processing module executes the following steps:

based on the input signal, executing a logic vector that contains a series of prompt commands in a looping logic structure for iteratively prompting an LLM on the LLM server about an internet entity for n times through the communications module, correspondingly receiving n batches of a plurality of answers from the LLM, and logging each of the batches of the answers as samples in the memory module; wherein the LLM processing unit accesses the LLM through the communications module to request for the answers from the LLM; wherein the answers comprise a first entity;

calculating an appearance frequency of the first entity as a number of batches containing the first entity divided by n by the math unit, and calculating a confidence score for the first entity;

displaying the first entity along with the appearance frequency of the first entity and the confidence score for the first entity through the user interface module;

wherein each time when prompting the LLM on the LLM server about the internet entity, an AI prompt builder unit of the processing module queries the LLM to generate an LLM confidence level for having the first entity;

wherein when logging each of the batches of the answers in the memory module, the LLM confidence levels for having the first entity are also logged;

wherein the math unit calculates a confidence interval, and when calculating the confidence score for the first entity, the math unit executes the following steps:

calculating an averaged LLM confidence level as a sum of the LLM confidence levels for having the first entity divided by n;

normalizing the appearance frequency of the first entity as a normalized appearance frequency, normalizing the confidence interval as a normalized confidence interval, and normalizing the averaged LLM confidence level as a normalized averaged LLM confidence level;

aggregating the normalized appearance frequency, the normalized confidence interval, and the normalized averaged LLM confidence level as the confidence score.

2. The system as claimed in claim 1, wherein each time when prompting the LLM on the LLM server about the internet entity, the AI prompt builder unit of the processing module queries the LLM to generate the LLM confidence level for having the first entity based on cross-checking the answers in the same batch;

wherein when logging each of the batches of the answers in the memory module, the processing module tracks the LLM confidence levels for having the first entity to dynamically adjust the confidence score calculated for the first entity.

3. The system as claimed in claim 1, wherein the memory module stores a sample threshold;

wherein when calculating the confidence score for the first entity, the math unit also calculates the confidence interval by executing the following steps:

determining whether n is greater than or equal to the sample threshold by the math unit;

when n is greater than or equal to the sample threshold, using a normal approximation formula of a binomial distribution to calculate the confidence interval.

4. The system as claimed in claim 3, wherein when n is less than the sample threshold, the math unit executes the following steps:

using a Wilson score interval to calculate the confidence interval.

5. The system as claimed in claim 1, wherein the normalized appearance frequency is calculated as:

$$(pi-\min(p))/(\max(p)-\min(p));$$

wherein pi is the appearance frequency of the first entity, min(p) is a minimum frequency in a dataset, and max(p) is a maximum frequency in the dataset.

6. The system as claimed in claim 1, wherein when normalizing the confidence interval, the math unit executes the following steps:

calculating a confidence width as an upper boundary of the confidence interval minus the lower boundary of the confidence interval;

calculating the normalized confidence interval as:

$$1-(CI\text{Width}-\min(CI\text{Width}))/(\max(CI\text{Width})-\min(CI\text{Width}));$$

wherein CIWidth is the confidence width, min (CIWidth) is a minimum confidence width in a dataset, and max (CIWidth) is a maximum confidence width in the dataset.

7. The system as claimed in claim 1, wherein the normalized averaged LLM confidence level is calculated as:

$$(GPTCn-\min(GPTCn))/(\max(GPTCn)-\min(GPTCn));$$

wherein GPTCn is the averaged LLM confidence level, min (GPTCn) is a minimum averaged LLM confidence level in a dataset, and max (GPTCn) is a maximum averaged LLM confidence level in the dataset.

8. The system as claimed in claim 1, wherein the answers comprise a plurality of entities, with the first entity being one of the entities;

wherein when producing each batch of the answers, a search engine unit of the processing module provides the LLM with real-time web data of the entities through a search engine of a search engine server, and thus a data merge unit of the processing module correspondingly receives a search result list of websites for each of the entities;

wherein when the processing module receives the search result list, a parse content unit of the processing module parses through contents of the websites on the search result list, to determine a relevance of the websites to each of the entities, and to rank the entities referenced by the websites, through a query sent to the LLM through the communications module for processing.

9. The system as claimed in claim 8, wherein after the parse content unit provides the query sent to the LLM about the internet entity, the data merge unit of the processing module executes the following steps:

when receiving an error code from accessing one of the websites, excluding the website associated with the error code from the search result list; and when determining that one of the websites is included more than once in the search result list, excluding duplications of the website from the search result list.

10. The system as claimed in claim 8, wherein when the parse content unit parses through the websites, a site authority unit of the processing module provides the LLM with a list of domains/brands of the websites, an authority of each of the domains/brands, and to associate the domains/brands to the entities with the relevance of the websites to each of the entities, and thus, the processing module accordingly receives an external confidence value from the LLM;

wherein the site authority unit queries the LLM to evaluate the authority of each of the domains/brands according to metrics established by page rank or domain authority.

11. The system as claimed in claim 10, wherein the memory module stores an appearance frequency weight, a probability weight, a confidence weight, and an external data weight; wherein the appearance frequency weight, the probability weight, the confidence weight, and the external data weight are normalized;

wherein each time when the processing module receives the search result list, the math unit of the processing module calculates a rank score for the first entity as:

(the normalized appearance frequency*the appearance frequency weight)+(the normalized confidence interval*the probability weight)+(the normalized averaged LLM confidence level*the confidence weight)+(the external confidence value*the external data weight).

12. The system as claimed in claim 11, wherein when the user interface module receives a weight change signal, the processing module adjusts at least one of the appearance frequency weight, the probability weight, the confidence weight, and the external data weight stored in the memory module.

13. The system as claimed in claim 11, wherein the memory module stores a final scoring weight data;

wherein after the math unit calculates the rank score m times, wherein m is a positive integer greater than one, the memory module stores a plurality of the rank scores for the first entity, a plurality of the appearance frequencies of the first entity, a plurality of the confidence intervals of the first entity, and the authorities of the domains/brands;

wherein a final scoring unit of the processing module calculates a final score for the first entity by aggregating the rank scores for the first entity, the appearance frequencies of the first entity, the confidence intervals of the first entity, and the authorities of the domains/brands according to the final scoring weight data.

14. The system as claimed in claim 13, wherein the processing module records the input signal, the final score, and a time information corresponding to the input signal as a historical data in the memory module;

wherein a rank manager UI unit of the processing module controls the user interface module to display an input set-up window and a historical data window;

wherein the input set-up window allows for customizing information comprised in the input signal by the user interface module;

wherein the historical data window displays the historical data recorded in the memory module.

15. The system as claimed in claim 13, wherein the processing module records the input signal, the final score, and the rank data of the internet entity in the memory module;

wherein a rank reports UI unit of the processing module controls the user interface module to display a visualization window and a rank result window, the visualization window displays a visualized statistical representation figure corresponding to the rank data of the internet entity;

the rank result window displays the input signal and the rank data of the internet entity recorded in the memory module.

16. The system as claimed in claim 13, wherein the input signal comprises a keyword information;

wherein the processing module records the input signal, the final score, and a time information corresponding to the input signal as a historical data in the memory module;

wherein a rank manager UI unit of the processing module controls the user interface module to display an input set-up window and a historical data window, and a rank reports UI unit of the processing module controls the user interface module to display a visualization window and a rank result window;

wherein the LLM processing unit, the math unit, the AI prompt builder unit, the search engine unit, the data merge unit, the parse content unit, the site authority unit, and the final scoring unit belong to a part of the processing module in a first server; and the rank manager UI unit and the rank reports UI unit belong to another part of the processing module in a second server;

wherein a keyword synchronization (sync) daemon of the processing module belongs to the second server and bridges the second server with the first server by synchronizing the keyword information between the first server and the second server.

17. The system as claimed in claim 13, wherein the processing module stores the final score for the first entity as a JSON file.

18. The system as claimed in claim 1, wherein the answers comprise a plurality of entities, with the first entity being one of the entities;

wherein each time when prompting the LLM on the LLM server about the internet entity, the AI prompt builder unit of the processing module queries the LLM to generate a list order, whereby a position of appearance of each of the entities from an LLM output is saved in the memory module, and thus the processing module receives a rank data corresponding to the position of appearance of each of the entities, tracking a high rank, a low rank and an average rank for each of the entities outputted from the LLM through the LLM processing unit.

19. The system as claimed in claim 1, wherein when prompting the LLM on the LLM server about the internet entity for n times, the AI prompt builder unit and a multi-sample LLM iteration unit of the processing module use a same prompt to query the LLM about the internet entity.

20. The system as claimed in claim 1, wherein when prompting the LLM on the LLM server about the internet entity for n times, the AI prompt builder unit and a multi-sample LLM iteration unit of the processing module generate a plurality of variation prompts relating to the input signal through the LLM, and then correspondingly use the variation prompts to query the LLM about the internet entity.

21. The system as claimed in claim 1, wherein the memory module stores an alternative prompt structure file;

wherein when the processing module executes the alternative prompt structure file, the processing module queries the LLM about the internet entity following a different set of steps detailed in the alternative prompt structure file for generating large variations in the answers for the internet entity.

22. The system as claimed in claim 1, wherein the answers comprise a plurality of entities, with the first entity being one of the entities;

wherein the input signal comprises a keyword information, a location information, a language information, and a brand information;

wherein the processing module filters out the entities that mismatch the keyword information, the location information, the language information, and the brand information.

23. The system as claimed in claim 1, wherein the input signal comprises a website information;

wherein a business validation unit of the processing module determines whether a website corresponding to the website information exists on the internet through the communications module;

when the website corresponding to the website information is non-existent on the internet, the business validation unit outputs a website error information.

24. The system as claimed in claim 23, wherein the input signal comprises a brand information;

wherein the business validation unit determines whether a brand corresponding to the brand information exists on the internet through the communications module;

when the brand corresponding to the brand information is non-existent on the internet, the business validation unit outputs a brand error information.

25. The system as claimed in claim 1, wherein the LLM on the LLM server is ChatGPT (GPT), and the processing module accesses the GPT's application programming interface (API) through the communications module.

* * * * *